(12) United States Patent
Lieberman et al.

(10) Patent No.: US 7,218,417 B2
(45) Date of Patent: May 15, 2007

(54) RESOLUTION CONVERSION USING A MORPHOLOGICAL PARTIAL PIXEL MAPPING (MPPM) APPROACH

(75) Inventors: David J. Lieberman, Fairport, NY (US); Stuart Alan Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 1074 days.

(21) Appl. No.: 10/354,385

(22) Filed: Jan. 30, 2003

(65) Prior Publication Data

US 2004/0150841 A1 Aug. 5, 2004

(51) Int. Cl.
*G06K 15/00* (2006.01)
*G06N 1/405* (2006.01)
*G06F 15/00* (2006.01)

(52) U.S. Cl. ...................... 358/3.06; 358/1.9
(58) Field of Classification Search ............... 358/1.9, 358/3.06, 1.18, 2.1, 3.01, 3.07, 3.1, 3.23, 358/534, 536, 538
See application file for complete search history.

(56) References Cited

U.S. PATENT DOCUMENTS

| | | | |
|---|---|---|---|
| 5,226,094 A | | 7/1993 | Eschbach |
| 5,282,057 A | | 1/1994 | Mailloux et al. |
| 5,293,254 A | | 3/1994 | Eschbach |
| 5,363,213 A | * | 11/1994 | Coward et al. ............ 382/299 |
| 5,387,985 A | | 2/1995 | Loce et al. |
| 5,528,704 A | * | 6/1996 | Parker et al. ............ 382/299 |
| 5,553,171 A | | 9/1996 | Lin et al. |
| 5,579,445 A | | 11/1996 | Loce et al. |
| 5,655,061 A | | 8/1997 | Tse et al. |
| 5,659,399 A | | 8/1997 | Lin et al. |
| 5,680,485 A | | 10/1997 | Loce et al. |
| 5,687,297 A | | 11/1997 | Coonan et al. |
| 5,689,343 A | | 11/1997 | Loce et al. |
| 5,724,455 A | | 3/1998 | Eschbach |
| 5,742,708 A | | 4/1998 | Yeh et al. |
| 5,754,710 A | | 5/1998 | Sekine et al. |
| 5,758,034 A | | 5/1998 | Loce et al. |
| 5,862,305 A | | 1/1999 | Girmay et al. |
| 5,956,470 A | | 9/1999 | Eschbach |
| 5,970,169 A | * | 10/1999 | Ittner ...................... 382/160 |
| 2003/0080984 A1 | * | 5/2003 | Hunter |
| 2005/0089228 A1 | * | 4/2005 | Mori |

* cited by examiner

*Primary Examiner*—Douglas Q. Tran
(74) *Attorney, Agent, or Firm*—Fay Sharpe LLP

(57) ABSTRACT

A method and system for converting, transforming or translating an imaging element associated with a first resolution into a second imaging element associated with a second resolution are provided. The method and system provide for the selection of output imaging element pattern based on context information extracted from areas neighboring an area undergoing conversion when information extracted from the area undergoing conversion provides an insufficient basis from which to select an output imaging element pattern. Exemplary embodiments are directed toward preservation of area coverage and centroid placement. The method provides for consideration of characteristics of a marking engine in the output imagine element pattern selections process. In xerographic environments clustering can be maximized, thereby reducing xerographic stress. In inkjet environments output pattern selections can be directed toward decreased clustering.

29 Claims, 10 Drawing Sheets

FIG. 3
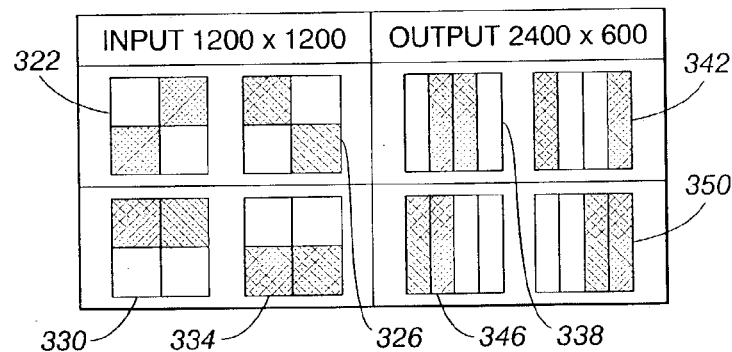
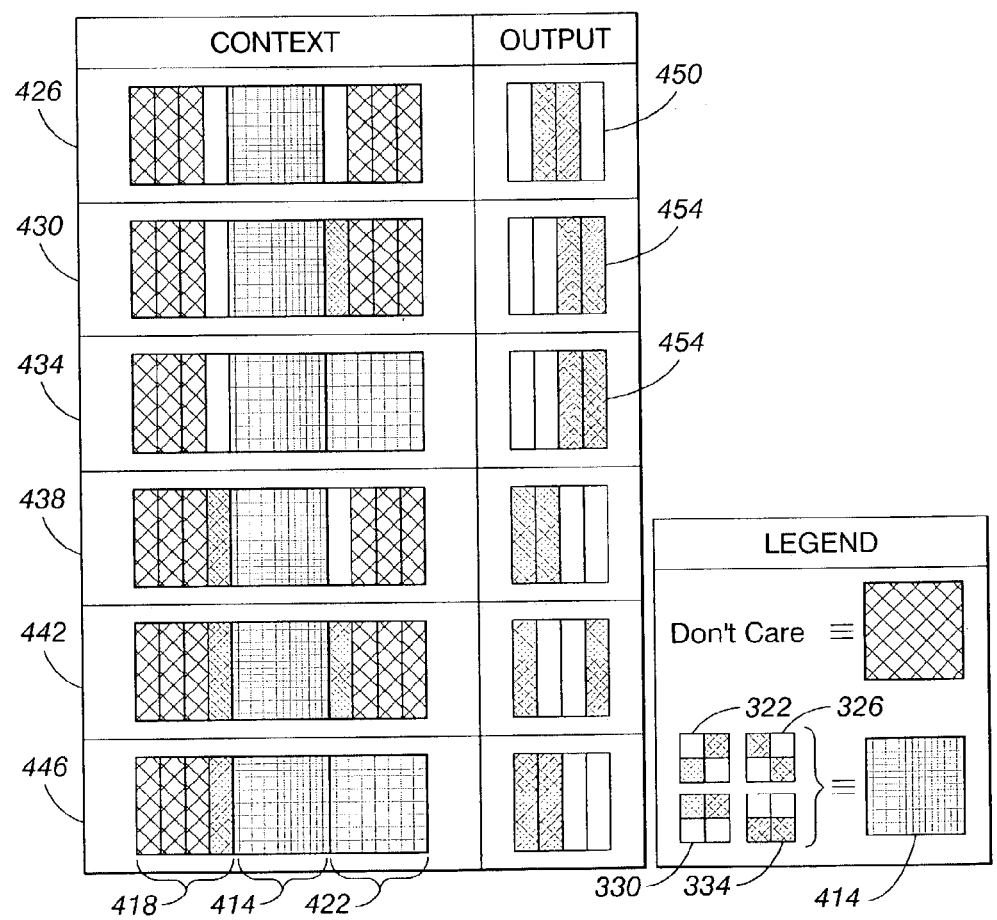
FIG. 4

| | EXAMPLE 1 | EXAMPLE 2 | EXAMPLE 3 | EXAMPLE 4 | EXAMPLE 5 |
|---|---|---|---|---|---|
| Original Imaging Area | | | | | |
| Selected Output Candidate | | | | | |
| \| AC Error \| | | | | | |
| # Transitions | 2 | 2 | 1 | 1 | 2 |
| $\varepsilon_1$ | 0 | 0 | 0 | 0.456 | 0 |
| $\varepsilon_2$ | 8/32 | 8/32 | 0 | 8/32 | 8/32 |
| Sufficient ? | Yes | Yes | Yes | No | Yes |

FIG. 14

RESOLUTION CONVERSION USING A MORPHOLOGICAL PARTIAL PIXEL MAPPING (MPPM) APPROACH

BACKGROUND

The invention is related to the art of image processing. The invention will be described in reference to electrophotographic applications, such as, for example, xerographic imaging. However, the invention can be applied in other areas, such as, for example, video image processing and lithographic systems.

In electronic imaging systems, images, such as, for example, pages of a document, are described in terms of high-level image or page description languages (PDL). Postscript™ is one such page description language well known in the art. In order to render an image, an image processor generates a binary image from the page description language description of the image. The binary image or bit map is in the form of a grid work or raster of mark/no mark decisions. The generation of a binary image from a page description language version of the image is referred to as raster image processing (RIP). In electrophotographic systems, a raster output scanner controls a marking engine to place spots of ink, toner, or other colorants on a print medium according to the binary mark/no mark decisions indicated in the bit map.

To achieve high print quality, it is necessary to RIP documents to a high resolution. Typically, these resolutions are symmetric. For example, resolutions such as 1200×1200, 1800×1800, or 2400×2400 dpi are common. For instance, these symmetric resolutions are supported by standard Postscript™ interpreters. However, due to mechanical constraints and economic factors, raster output scanner electronics are often designed to support asymmetric high addressable resolutions, such as 1200×600, 2400×600, and 4800×600 instead of the symmetric resolutions mentioned above. Occasionally, the reverse situation applies. In either case, a resolution conversion is required to make the output of the raster image processor (RIPer) compatible with the raster output scanner (ROS) electronics.

Previously, techniques such as perspective projection (PP) were used to provide resolution conversion. Unfortunately, PP can create quantization errors and discard positioning information. This may result in reduction in print quality. Additionally, PP cannot be easily implemented in-line; it requires use of error diffusion, dramatically increasing the gate count and complexity. For more information on perspective projection, see U.S. Pat. No. 5,655,061 to Tse, et la., entitled, System and Method for Providing a High-Addressable Printing System.

For the foregoing reasons, there is a desire for a resolution conversion system and method that can be easily implemented in-line and maintain position information while minimizing quantization error generation.

SUMMARY

A method for converting a first imaging element having a first resolution into a second imaging element having a second resolution has been developed. The method comprises selecting a small area of the first imaging element to be an area under conversion, examining the area under conversion, selectively extracting context information from areas in the first imaging element neighboring the area under conversion, and, selecting an imaging element area pattern from a plurality of imaging element area patterns in the second resolution based on a goal of preserving at least one aspect of the area under conversion, and selectively, on the extracted context information.

For example, examining the area under conversion can include one or more of determining an area coverage aspect of the area under conversion, determining a centroid of the area under conversion, and determining a connectedness aspect of the area under conversion.

Selecting the imaging element area pattern from a plurality of imaging element area patterns can include one or more of selecting an imaging element area pattern from the plurality of imaging element area patterns that most closely preserves the area coverage of the area under conversion, selecting an imaging element area pattern from the plurality of imaging element area patterns that most closely preserves the centroid of the area under conversion, and selecting an imaging element area pattern from the plurality of imaging element area patterns that most closely preserves the connectedness of the area under conversion.

Extracting context information from areas in the first imaging element neighboring the area under conversion can include determining a black/white/indeterminate connectedness between the area under conversion and the neighboring areas. In that case, selecting the imaging element area pattern from a plurality of imaging element patterns can include selecting the imaging element pattern based on the black/white/indeterminate connectedness determination.

The method can further include deciding to select the imaging element pattern based on context information, based on a measurement of error between a centroid of the area under conversion and a centroid of a candidate imaging element area pattern. Additionally, or alternatively the method can include deciding to select the imaging element area pattern based on context information, based on a measurement of error between an area coverage of the area under conversion and an area coverage of a candidate imaging element area pattern.

Selecting an imaging element pattern area from a plurality of imaging element area patterns can include selecting a pattern from a sparsely filled look up table, reconstructing missing data in association with the selected pattern, and combining the reconstructed data with the selected pattern.

An apparatus operative to convert a first imaging element having a first resolution into a second imaging element having a second resolution can include a means for providing a second imaging element area pattern based on processing of an imaging element area under going conversion, a means for providing a second imaging element area pattern based on a context of the imaging element area undergoing conversion, and a means for selecting between the imaging element area pattern from the means for providing a second imaging element area pattern based on processing of an area under going conversion and the imaging element area pattern from the means for providing a second imaging element area based on a context.

For example, the means for providing a second imaging element area pattern based on processing of the imaging element area under going conversion can include a point process look up table. The means for means for providing a second imaging element area pattern based on a context can include a context dependent look up table. The means for selecting between the pattern from the means for providing a second imaging element area pattern based on processing of the imaging element area undergoing conversion and a pattern from the means for providing the second imaging element based on the context can include a multiplexer operative to receive a signal indicating whether or not information available in the imaging element area undergoing conversion is sufficient for basing a selection of a second imaging element on, and further operative to receive an first imaging element area pattern from the means for providing a second imaging element area pattern based on processing of the imaging element area under going conversion and the second imaging element area pattern from the means for providing a second imaging element based on a context.

Some embodiments of the apparatus include means for generating an index into the context dependent look up table based on an aspect of a previously converted area neighboring the area under conversion and an aspect of a neighboring area next to be processed. The means for generating an index can include a next pixel table operative to predict a state of an output pattern associated with an image element area bordering the imaging element area undergoing conversion, and a delay block operative to provide the state of an output pattern of an image element area previously converted neighboring the imaging element area undergoing conversion.

For instance, the apparatus can include an electrophotographic-rendering device for rendering the selected imaging element area pattern.

An embodiment of the invention includes a method for translating a binary image in a first resolution into a binary image in a second resolution using morphological partial pixel mapping. The method includes selecting an image area for translating from the first resolution to the second resolution, extracting local features from the selected area, determining if the extracted local features provide enough information to use point processing techniques to generate a related image area in the second resolution, generating an index into a point process look up table from the extracted local feature information if it is determined that the extracted local features provide enough information, extracting context information from neighboring image areas if it is determined that the extracted local features do not provide enough information, generating an index into a contextual look up table based on a combination of the extracted local feature information and the extracted context information if it is determined that the extracted local features do not provide enough information, and outputting an image pattern in the second resolution based on an output from one of the point process look up table and the contextual look up table.

Extracting local features can include, extracting an area coverage parameter, extracting centroid information, and/or extracting a measure of connectedness.

Generating an index into a point process look up table can include using binary pixel information from the selected image area as an index into the point process look up table.

Extracting context information from neighboring image areas can include determining a state of a first binary pixel element from a neighboring converted image area and/or predicting a state of a second binary pixel element from a neighboring image area that is yet to be converted.

The method can further include rendering the outputted image pattern with an electrophotographic rendering device optimized for rendering images with the second resolution.

Advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various procedures and arrangements of procedures. The drawings are not to scale and are only for purposes of illustrating preferred embodiments and are not to be construed as limiting the invention.

FIG. 3 is a table showing an example of first input imaging element patterns in association with selected second or output imaging element patterns. Context information must be extracted from areas neighboring the area under conversion in order to best associate first or input patterns with second or output patterns.

FIG. 4 is a table showing an example of associating the first or input patterns of FIG. 3 with the second or output patterns of FIG. 3 based on context information extracted for areas neighboring the area under conversion.

FIG. 14 is a table showing five exemplary input imaging element area patterns in association with candidate output imaging element area patterns as well as the results of mathematical evaluations of the candidate output imaging element area patterns.

DETAILED DESCRIPTION

Figure 1:
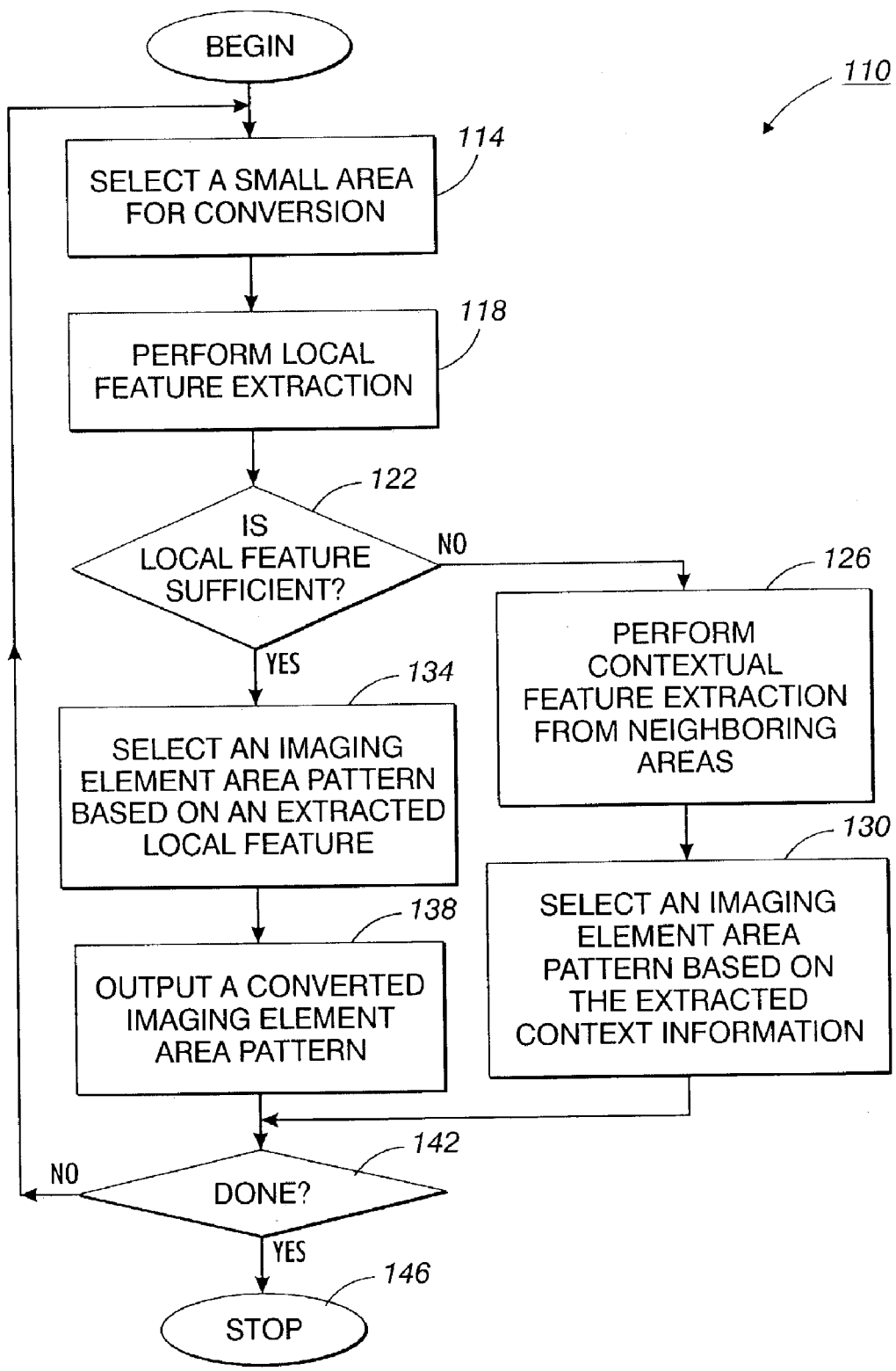
FIG. 1 is a flow chart outlining a method for converting, transforming or translating a first imaging element associated with a first resolution into a second imagine element associated with a second resolution.

Referring to FIG. 1, a method 110 for converting or translating a first imaging element having a first resolution into a second imaging element having a second resolution includes selecting 114 a small area of the first imaging element for conversion, performing local feature information extraction 118 on the selected area (or area under conversion), and determining 122, based on the extracted features, whether or not the extracted feature information is sufficient for performing a conversion. If the information provided by the local feature extraction 118 is insufficient for performing the conversion, the method 110 for converting a first image element in a first resolution into a second imaging element in a second resolution includes extracting contextual information 126 from neighboring imaging areas and selecting 130 an imaging element pattern in the second resolution based on the extracted context information and the extracted local feature information. If the local feature information is sufficient, then an imaging element area pattern is selected 134 based on one or more of the extracted local features.

Whether the selected imaging element area pattern is based on one or more local features 118 or contextual information 126 in combination with one or more local features 118, the selected imaging element area pattern is output 138 as a conversion, translation or transformation for the area under conversion. If the entire imaging element has been converted 142, processing stops 146. If 142 the imaging element includes portions yet to be converted, processing continues with the selection 114 of a new area for conversion.

An imaging element can be any tool, object, or image associated with a resolution in an image-processing environment. For example, an imaging element can be a binary version of an image or a halftone cell design.

Selection 114 of areas for conversion can be based on any desirable procedure. However, the conversion process 110 is simplified when areas for conversion are selected 114 in an orderly fashion. For example, imaging element areas can be processed in raster scan order, from left to right, and from top to bottom. Reasonable assumptions are made about the invalid areas for processing purposes. For instance, an imaging element border may be padded with white or a pixel-replicated version of the nearest valid imaging element area.

The method 110 for converting, transforming or translating a first imaging element in a first resolution into a second imaging element having a second resolution is referred to as Morphological Partial Pixel Mapping (MPPM). MPPM will be described in greater detail in reference to several examples. In a first example, a digital front end (DFE), or ripper, generates a binary version of an image from a TIFF version or some page description language (PDL), such as portable document format (PDF), printer control language (PCL) or Postscript™, version of the image. The resulting binary (a.k.a. ripped) version of the image has a symmetric resolution of 1200×1200 dots per inch (dpi). However, an associated marking engine is designed to best accommodate images described in a 4×HA or 2400×600 dpi asymmetric resolution.

Selecting 114 a small area for conversion includes selecting a small imaging element area size for the areas under conversion. An area size of a single 600×600 dpi pixel divides evenly into the input resolution (1200×1200 dpi) and the output resolution 2400×600 dpi of this example. For instance, let the original vertical and horizontal resolution be V1, and H1, respectively, and the original imaging area be R1 rows of pixels by C1 columns of pixels. Also let the output vertical and horizontal resolution be V2, and H2 respectively, and the output imaging area be R2 rows of pixels by C2 columns of pixels. It is preferred that A) V1*R1=V2*R2, and B) H1*C1=H2*C2. In other words, it is desirable that the shape, size and/or aspect ratios of the area under conversion and the related or corresponding output area are the same.

This is beneficially achieved by selecting the dimensions of the sides of these areas to be the least common multiples of the reciprocals of the two respective resolutions (input and output) that provide a conversion with and acceptably low quantization error. For example in the 1200×1200 input resolution to 2400×600 output resolution case, H1=1200 dpi, H2=600 dpi, V1=1200 dpi, and V2=2400 dpi. We seek the smallest integer values of R1 and R2 such that A) holds, namely R1/1200=R2/600, and the smallest integer valued C1 and C2 such that B) holds, namely C1/1200=C2/2400. This leads to R1=C1=2, and R2=1, and C2=4. Both the area under conversion and the related or corresponding output image element area comprise four pixels (2×2 and 1×4 respectively). Therefore, the quantization error of conversions based on this area selection 114 can always be zero. Clearly, zero is an acceptably low quantization error. Therefore, the areas under conversion in this example are selected to encompass 2×2 pixels in the input resolution and 1×4 pixels in the output resolution. These areas are the size of a single 600×600 dpi pixel.

Figure 2:
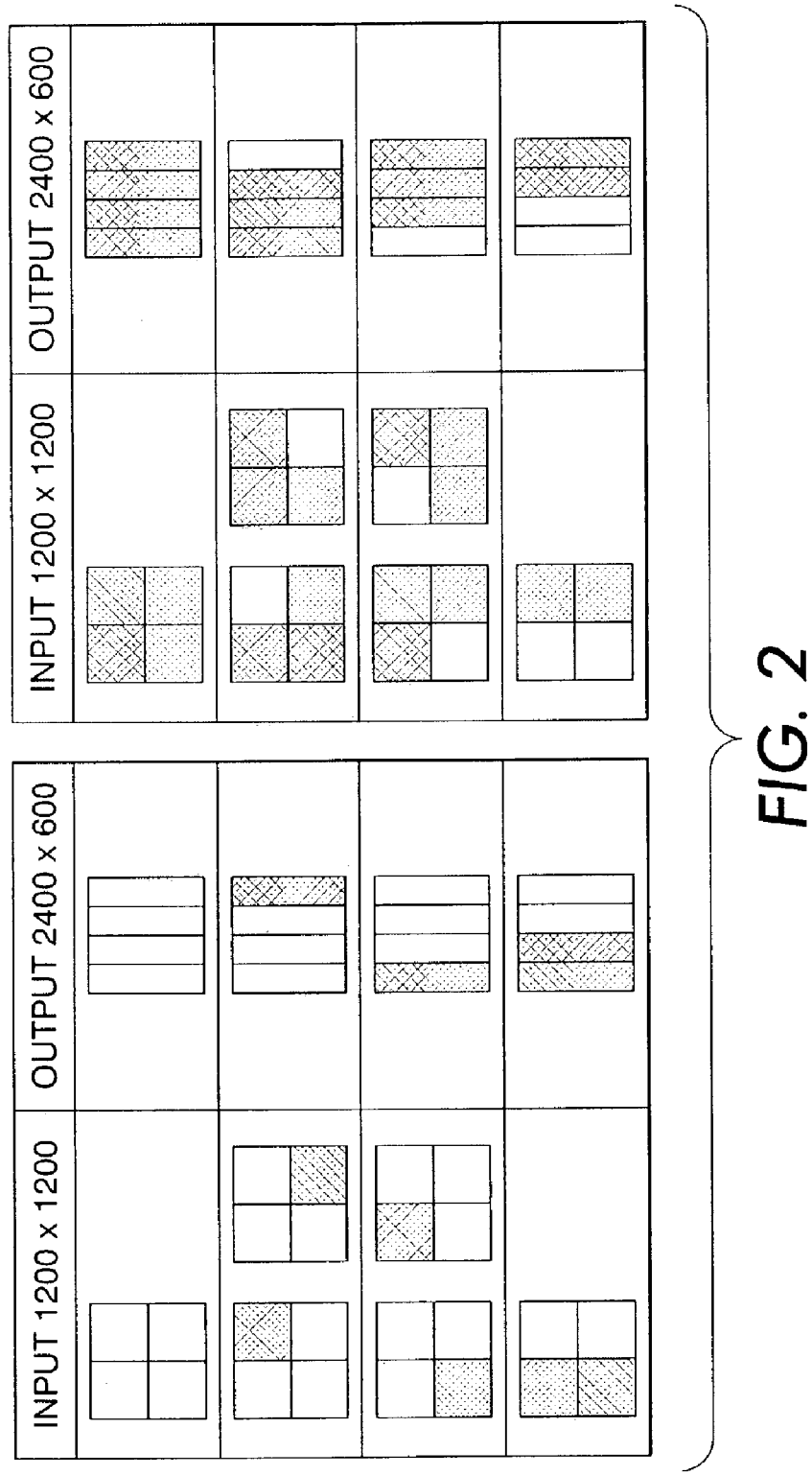
FIG. 2 is a table showing an example of first or input imaging element patterns in association with selected second or output imaging element patterns according to the method of FIG. 1. The output imaging element patterns were determined by point processing, or by examining only local features of the imaging element undergoing conversion.

Referring to FIG. 2, for each resolution (input and output), the area under conversion is uniquely specified by four binary values. Therefore, the conversion can be guaranteed to preserve area coverage (AC), which is a goal in this example. Of the 16 possible input patterns, 12 have resolution conversion solutions that are intuitively obvious to those of skill in the art. These 12 input patterns are shown in FIG. 2 in association with their respective conversion solutions. The four patterns for which an obvious solution does not exist all have 50 percent AC, as illustrated in FIG. 3. Any one of these four input patterns 322, 326, 330, 334 might be replaced with any one of the four potential output patterns 338, 342, 346, 350. For example, each of the input patterns 322, 326, 330, 334 has a 50 percent area coverage, as do each of the output patterns 338, 342, 346, 350. Therefore, a mapping between these input patterns and output patterns cannot be based on area coverage. Additionally, for example, output pattern 338 has the same centroid as input patterns 322 and 326. Therefore, it is difficult to know which of the input patterns 322, 326 should be converted to the output pattern 338 and which of the input patterns 322, 326 should be associated with one of the other output patterns 342, 346, 350. More information is needed to make an intelligent selection. Therefore, when an area under conversion includes one of the ambiguous input patterns 322, 326, 330, 334, a determination 122 is made that the extracted 118 local feature information is insufficient for selecting an imaging element area output pattern. Therefore, during the conversion process 110, context information is extracted 126 from neighboring imaging areas.

For example, referring to FIG. 4, an imaging element under conversion 414 is associated with an imaging element area pattern 322, 326, 330, 334 for which local feature extraction 118 does not provide definitive information for selecting an output imaging area pattern. Therefore, context information is extracted 126 from neighboring imaging element areas 418, 422. In the present example, the neighboring imaging element areas are examined with an eye toward maximizing a level of clustering. That is, an effort is made to group marked pixels next to marked pixels and unmarked pixels next to unmarked pixels. This reduces the level of stress on, for example, a xerographic marking engine, resulting in more robust behavior and improved rendered image quality.

The context is chosen to be three consecutive imaging areas. From left to right, the three areas are: a previously processed imaging area 418 whose pattern substitution choice is assumed to be available for inspection because it was generated in previous area conversions, the center imaging area under test 414, and the "next" imaging area 422 to be converted.

The center imaging area 414 has one of the four input patterns 322, 326, 330, 334 for which there is no obvious solution The lack of an obvious output solution is represented by a gray box 414 in FIG. 4. The previously processed imaging element area 418 has already been converted into a 2400×600 output binary imaging area pattern. Only the right-most pixel of that pattern is of interest. In the present example, the three left-most pixel values do not contribute to clustering analysis of the area under conversion 414 and are labeled in FIG. 4 as "Don't Care" states.

For the next imaging area 422, there are two possibilities. 1) The original pattern for the imaging area has one of the obvious or "point-process" patterns for which an obvious solution exists. In this case, the left-most pixel is of interest and the three right-most pixels are "Don't Care" states. 2) The original pattern for this imaging area has one of the four input patterns 322, 326, 330, 334 for which there is no obvious solution and can only be described as indeterminate (gray), just like the area under conversion 414. Therefore, there are a total of six possible context situations to consider: black/white edge for the previous area 418 vs. black/white/indeterminate for the next area 422. These six cases are represented by six rows 426, 430, 434, 438, 442, 446 of FIG. 4. In each case, the objective is to cluster white (unmarked) next to white (unmarked) and black (marked) next to black (marked). This will reduce the number of black-to-white and white-to-black transitions (T), which is the preferred situation where the marking engine is xerographic in nature. For example, some xerographic print engines are subjected to variable dot gain and other imaging artifacts when pressed to produce extremely high frequency dot patterns.

On the other hand, other reprographic environments may benefit from reduced clustering or an increased number of transitions (T). For instance, in some inkjet environments, image quality may benefit from a reduced level of clustering and increased number of transitions. Therefore, when the method 110 is applied in inkjet environments, each input imaging element area pattern might be associated with a different output imaging element area pattern than those shown in FIG. 4. In this regard, the method 110 (MPPM) provides for the consideration of characteristics of the marking engine.

The method 110 for converting, transforming or translating a first imaging element having a first resolution into a second imaging element having a second resolution can be implemented in hardware, software, or a combination thereof.

Figure 5:
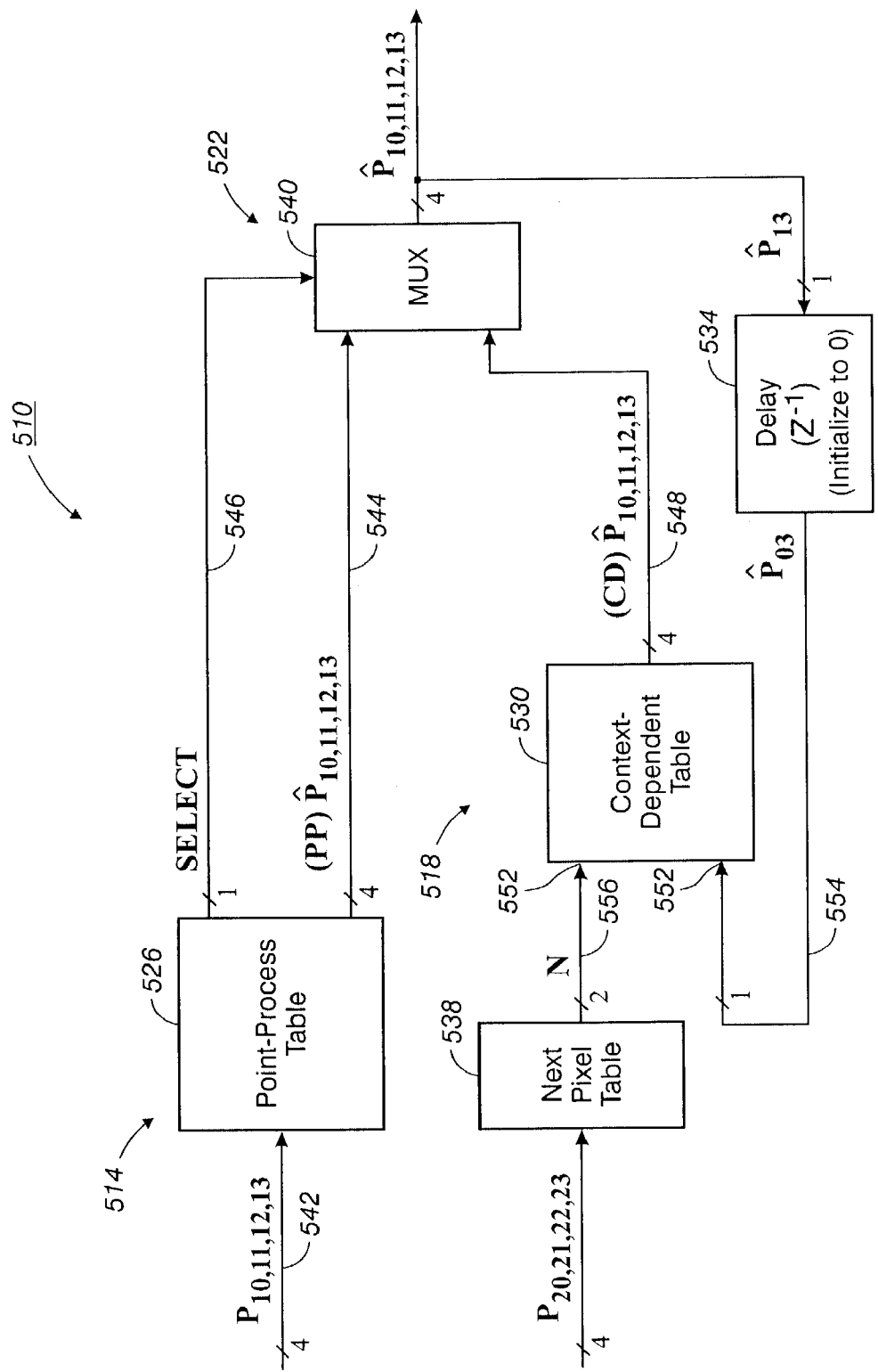
FIG. 5 is a block diagram of an apparatus operative to perform the method of FIG. 1.
Figure 6:
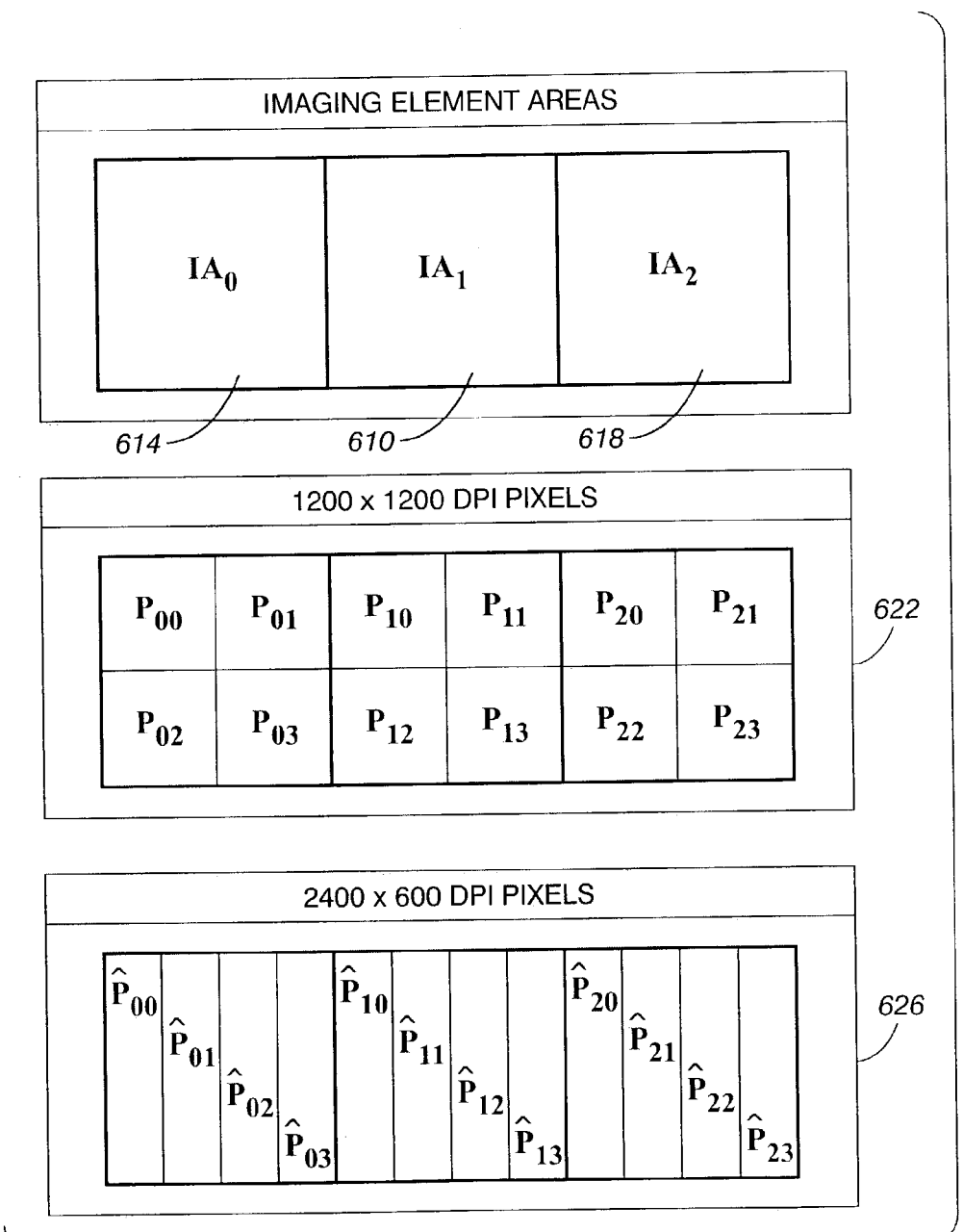
FIG. 6 is a diagram outlining the meaning of pixels references used in FIG. 5.

Referring to FIG. 5 and FIG. 6, an apparatus 510 operative to convert a first image description having a first resolution into a second image description having a second resolution includes a means 514 for providing a second image description based on a processing of an image area undergoing conversion, a means 518 for providing a second image description based on a context of the area undergoing conversion, and means 522 for selecting between a pattern from the means 514 for providing a second image description based on processing of the area undergoing conversion and a pattern from the means 518 for providing a second image description based on the context of the area undergoing conversion. In the illustrated embodiment, the means 514 for providing a second image description based on processing of an area undergoing conversion includes a point process lookup table 526. The means 518 for providing a second image description based on a context of the area undergoing conversion includes a context-dependent lookup table 530, a pixel delay 534 and a next pixel table 538. However, those of ordinary skill in the art will understand that other means 514, 518 can be substituted. For example, real time calculation or analysis blocks can be used instead of look-up tables.

FIG. 6 depicts an imaging element area under test 610 in relation to neighboring imaging element areas that might be analyzed for context information. The neighboring imaging element areas include a previously processed imaging element area 614 and a next-to-be-processed imaging element area 618. FIG. 6 also provides pixel maps for the imaging element areas 610, 614, 618 as they are represented in the input resolution 622 and output resolution 626. For example, the imaging element area undergoing conversion 610 encompasses four square-shaped pixels $P_{10}$, $P_{11}$, $P_{12}$, P13 arranged in a square pattern. In the output resolution 626 space, the area 610 under conversion is rendered with four consecutive vertical strip-shaped pixels labeled $P\hat{\,}_{10}$, $P\hat{\,}_{11}$, $P\hat{\,}_{12}$, $P\hat{\,}_{13}$. Similarly, the previously processed imaging element area 614 includes square pixels $P_{00}$, $P_{01}$, $P_{02}$, $P_{03}$ arranged in a square in the symmetric input resolution and by side-by-side vertical strip-shaped pixels $P\hat{\,}_{00}$, $P\hat{\,}_{01}$, $P\hat{\,}_{02}$, $P\hat{\,}_{03}$ in the asymmetric output resolution 626. The next image element area 618 to be processed encompasses four square pixels arranged in a square $P_{20}$, $P_{21}$, $P_{22}$, $P_{23}$ in the symmetric input resolution 622, and four side-by-side vertical strip-shaped pixels $P\hat{\,}_{20}$, $P\hat{\,}_{21}$, $P\hat{\,}_{22}$, $P\hat{\,}_{23}$ in the asymmetric output resolution 626. The input resolution pixels $P_{10}$, $P_{11}$, $P_{12}$, $P_{13}$ of the imaging element area under conversion 610 are used as an input 542 or index into the point process lookup table 526.

If values of the input resolution 622 pixels $P_{10}$, $P_{11}$, $P_{12}$, $P_{13}$ describe an input imaging element area pattern that has an obvious analog pattern in the output resolution 626 or if information extracted from the input pattern of the input pixels $P_{10}$, $P_{11}$, $P_{12}$, $P_{13}$ is sufficient 122 to select an output pattern, then an output pattern or information related to the output pattern is stored in the point process lookup table 526 and the input pixel values $P_{10}$, $P_{11}$, $P_{12}$, $P_{13}$ are an index to the storage location of the output pattern. Under these circumstances, the "obvious" output resolution pattern is delivered as an output 544 of pixel values $P\hat{\,}_{10}$, $P\hat{\,}_{11}$, $P\hat{\,}_{12}$, $P\hat{\,}_{13}$ from the point process lookup table 526 to the multiplexer 540.

If the pattern represented by the input pixel $P_{10}$, $P_{11}$, $P_{12}$, $P_{13}$ does not include sufficient information or does not have an obvious analog in the output resolution, a select bit 546 from the point process lookup table 526 indicates to the multiplexer 540 that the multiplexer 540 should look elsewhere for an output pattern and that the output 544 pixels $P\hat{\,}_{10}$, $P\hat{\,}_{11}$, $P\hat{\,}_{12}$, $P\hat{\,}_{13}$ of the point process lookup table 526 are invalid.

As mentioned above, the mux 540 also receives an output pattern 548 from the context-dependent lookup table 530. An input or index 522 into the context-dependent table includes three bits of information. One bit is the state of a pixel $P\hat{\,}_{03}$ from the previously processed imaging element area 614 neighboring the imaging element area currently under conversion 610. This information is provided by the delayed block 534. Each time an imaging element 610 undergoes conversion, the delay block receives the state of the right-most pixel $P\hat{\,}_{13}$ of the output pattern and stores it. When processing advances to a new or next imaging element area, the delay block 534 provides the stored information as $P\hat{\,}_{03}$, the right-most pixel of the previously processed imaging element area 614. The other two bits 556 come from the next pixel lookup table 538. The next pixel lookup table 538 receives input or index information $P_{20}$, $P_{21}$, $P_{22}$, $P_{23}$ from the input resolution pixels of the neighboring or next imaging element area 618 to be processed. The output bits 556 of the next pixel table indicate whether the left-most pixel $P\hat{\,}_{20}$ and, therefore, the pixel neighboring the imaging element area undergoing conversion 610, of the next imaging element area 618 will be, for example, black, white, or is undeterminable.

The context-dependent lookup table 530 is loaded under the assumption that if the context-dependent lookup table 530 is being used, the imaging element area undergoing conversion 610 is associated with input pixels $P_{10}$, $P_{11}$, $P_{12}$, $P_{13}$ that describe an input pattern which does not provide enough local feature information to use the point process lookup table 526 to determine an output pattern. For example, the context-dependent lookup table is loaded under the assumption that when the context-dependent lookup table is used, the input pixels $P_{10}$, $P_{11}$, $P_{12}$, $P_{13}$ describe one of the input patterns 322, 326, 330, 334 illustrated in FIG. 3 and FIG. 4. Therefore, the context-dependent lookup table 530 is filled with the input/output relationships similar to those shown in FIG. 4.

For instance, if the output 554 of the delay block 534 ($P^\wedge_{03}$) indicates that the right-most pixel of the previously processed 614 imaging element area is white and the output 556 from the next pixel table 538 indicates that the left-most pixel $P^\wedge_{20}$ is white, then the context of row 426 exists, and the context-dependent lookup table 530 provides the output pattern 450 having white pixels on either side $P^\wedge_{20}$, $P^\wedge_{23}$ and black pixels centrally located $P^\wedge 21$, $P^\wedge_{22}$. If the inputs indicate that the area undergoing conversion will be bordered by a white pixel on the left side and a black pixel on the right side, then the context condition of row 430 exists and the context-dependent lookup table 530 outputs the pattern 454 having two white pixels on the left side and two black pixels on the right side. The same pattern 454 may be output if the pixel neighboring the area under conversion is white and the pixel neighboring the area under conversion on its right side is indeterminate (see context 434).

The means for selecting 522 (or mux 540) selects a pattern from those provided by the point process lookup table 526 and the context-dependent lookup table 530 based on the state of the select line 546 provided by the point process lookup table 526. The multiplexer 540 delivers the selected pattern to, for example, some aspect of an imaging system. For instance, the selected pattern is delivered to a buffer where an imaging element is assembled. Where the imaging element is a binary image, the imaging element may eventually be delivered to a rendering device, such as, for example, an electrophotographic print engine. For instance, the binary image may be delivered to a xerographic or ionographic print engine, an inkjet print engine, or some other device, such as, a video display system.

In a second example, the imaging element being converted, translated or transformed is a halftone cell design. Such a conversion or transformation can be useful where a halftone cell has been designed to work with a print engine with an asymmetric resolution but an associated ripper produces bit maps with symmetric resolutions. In such a situation, it can be beneficial to provide the ripper with a symmetric halftone cell that is equivalent to, or an encoded version of, the available asymmetric halftone cell.

For example, consider the following clustered halftone dot design task: We begin with $D_{24 \times 6}$, a clustered dither array that is intended to operate upon pictorials and is optimized for use with 2400×600 raster output scan (ROS) electronics. For each gray level G, the corresponding output binary $B_{24 \times 6}$ is given by $B_{24 \times 6} = D_{24 \times 6}$ (G), G=0, 1, ..., 255.

We want to design a new clustered dither array ($D_{12 \times 12}$) that can be supported by a symmetric 1200×1200 RIP. For each gray level G, the corresponding output binary $B_{12 \times 12}$ is defined as $B_{12 \times 12} = D_{12 \times 12}$ (G), G=0, 1, ..., 255.

As shown above, the resolution conversion method (MPPM) 10 can be applied to any $B_{12 \times 12}$ to generate the resolution conversion results given by $B'_{24 \times 6}$=MPPM ($B_{12 \times 12}$) However, we would like to optimize $B_{12 \times 12}$ for conversion. Since we have $D_{24 \times 6}$, which produces binaries $B_{24 \times 6}$, which are optimized for the available ROS, we can generate optimized symmetric binaries by ripping with $D_{12 \times 12}$ such that $$D_{12 \times 12}(G) = MPPM(D_{24 \times 6}(G)) \text{ for all } G. \quad 1)$$

Figure 7:
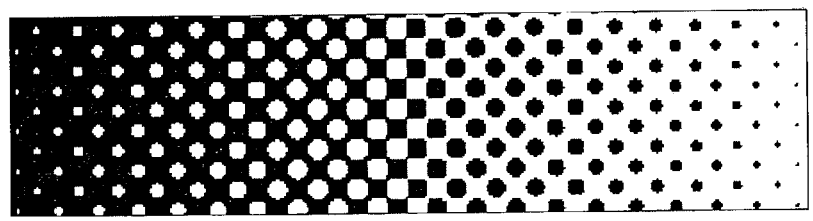
FIG. 7–FIG. 11 are binary images illustrating results of using the method of FIG. 1 to generate, convert, or encode a halftone cell design in a first resolution into a halftone cell design in a second resolution.
Figure 8:
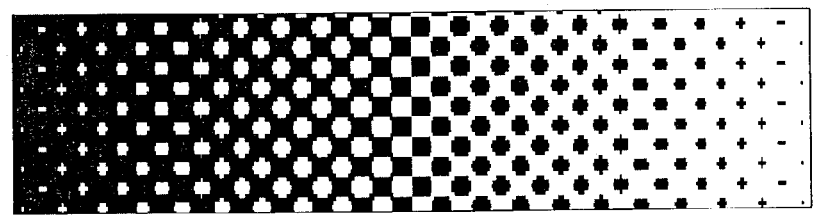
Figure 9:
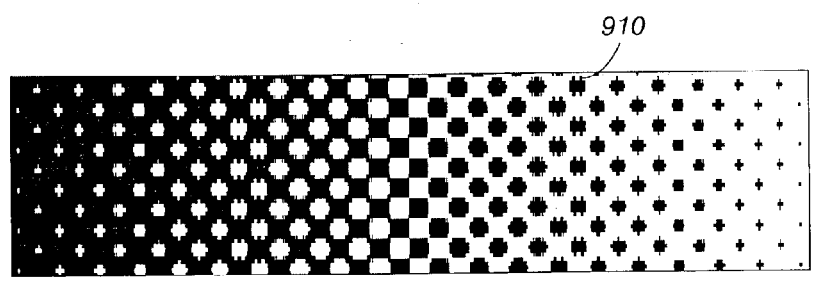

That is, we need a dither array $D_{12 \times 12}$ that generates binaries that after undergoing resolution conversion using MPPM (method 110), results in the intended 2400×600 binary that is optimized for the ROS electronics. In FIG. 7 and FIG. 8, binaries corresponding to a non-optimized symmetric 12×12 RIP and an asymmetric 24×6 RIP of a grayscale sweep are illustrated, respectively. When the 12×12 binary image of FIG. 7 is converted into 24×6 using method 110, the resulting patterns are as indicated in FIG. 9. The sweep of FIG. 9 shows an increased number of transitions 910 along some of the dot cluster perimeters. The dot clusters are not nearly as robust as the dot clusters of the 24×6 based binary image illustrated in FIG. 8. Such transitions 910 significantly increase the stress on some xerographic processes. This can result in an increased granularity, coarseness, and contouring.

Figure 10:
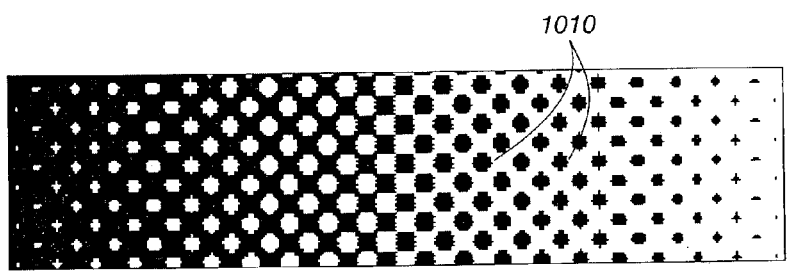
Figure 11:
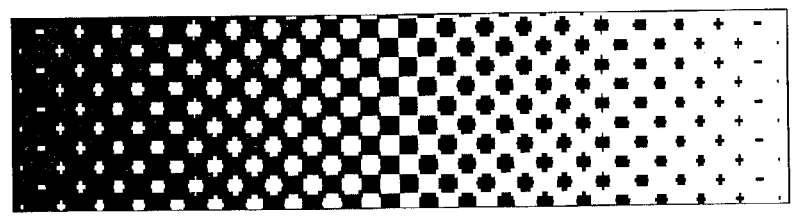

We have the $D_{24 \times 6}$ clustered dither array halftone cell that produces the less stressful sweep of FIG. 8. However, $D_{24 \times 6}$ is not compatible with the available ripper. Fortunately, using MPPM (method 110), we can convert the available $D_{24 \times 6}$ array, or, in a sense, encode it, into a $D_{12 \times 12}$ dither array that is compatible with the available ripper. The resulting $D_{12 \times 12}$ design allows the ripper to generate the binary image illustrated in FIG. 10 based on the input gray scale sweep. This binary exhibits undesirable transitions 1010 at this intermediate stage. However, after the method 110 described above (MPPM) is applied to the binary image of FIG. 10, it is converted into the binary image illustrated in FIG. 11. The binary image of FIG. 11 is identical to the target binary image of FIG. 8 and is optimized for the available ROS electronics.

The halftone cell conversion or encoding process can be performed offline for each clustered dot design to be supported by a particular printer. For example, the conversion is performed by a software-based embodiment of the method 110. Then the resulting $D_{12 \times 12}$ designs are loaded into the printer or RIP as the default 1200×1200 resolution dot designs.

When applying the method 110 (MPPM) to a clustered screen, areas under conversion having threshold gradient directions may be determined 122 to have obvious output resolution analogs. However, making the determination 122 can unnecessarily complicate implementation and performance of the method 110 (MPPM). Examining 126 context when it is not absolutely necessary does not adversely effect conversion results. Therefore, the determination 122 is usually made that contextual feature extraction 126 should be performed. For example, as in the first example, three consecutive imaging element areas are examined.

Figure 12:
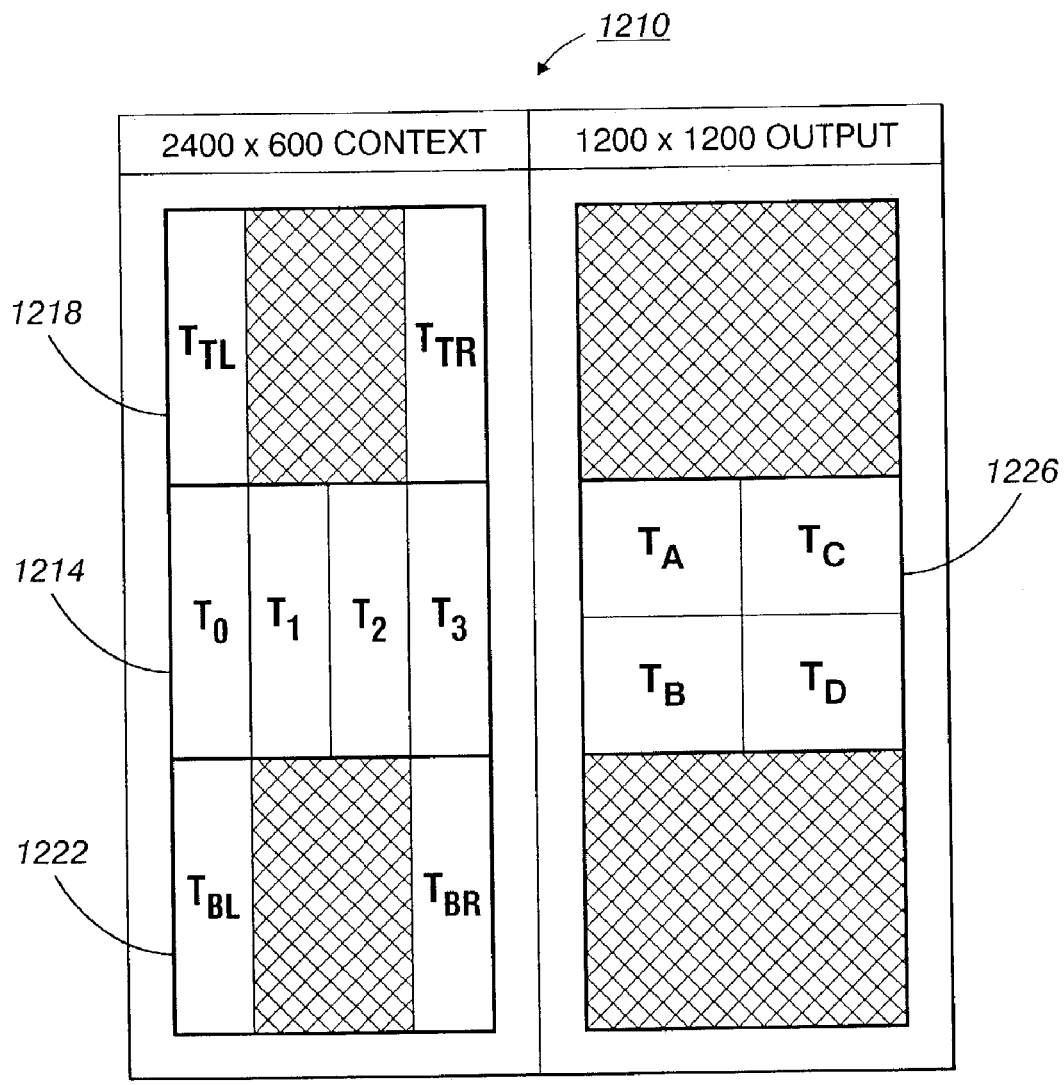
FIG. 12 is a generalized view of a halftone cell area under conversion: having a first resolution and neighboring areas examined for context information and a generalized view or a halftone cell output pattern having a second resolution.

Since the resolutions in this second example are the same as in the first example, the imaging areas used can be the same size as described in the first example. However, referring to FIG. 12, due to the verticality of the strip-shaped pixels of the input resolution, 1210, the three areas of context 1214, 1218, 1222 are orthogonal to the three areas of context 614, 618, 622 used in the first example. Again, the imaging element area under conversion 1214 is centered between neighboring areas 1218, 1222 which are examined 126 for context information. The area under conversion 1214 includes an array of thresholds $T_0, T_1, T_2, T_3$ associate with four vertical strip-shaped pixel areas. During the selection 130 or generation of the related imaging element area output pattern, the thresholds $T_0, T_1, T_2, T_3$ will be assigned to square-shaped threshold or pixel locations $T_A, T_B, T_C, T_D$ arranged in a square pattern as indicated in FIG. 12 by the output symmetric resolution 1226. The context information of interest includes information regarding four pixels. Two of the four pixels are outer pixels of the neighboring area above the area 1218 under conversion 1214. They are referred to as the top-left (TL) and top-right (TR) pixels. The other two pixels are the outer pixels of the area 1222 below the area under conversion 1214. These pixels are referred to as the bottom-left (BL) and bottom-right (BR). The threshold assignment, or output pattern selection 130, is achieved through the application of the following two rules:

Rule 1: Since $T_0$ and $T_1$ ($T_2$ and $T_3$) are on the left-hand side (right-hand side) of the imaging area under test, these two thresholds must be assigned to $T_A$ and $T_B$ ($T_C$ and $T_D$), and Rule 2: If $T_{TL} > T_{BL}$, then $T_A = \max(T_0, T_1)$ and $T_B = \min(T_0, T_1)$, and visa versa if $T_{TL} < T_B$. This rule is applied similarly to $T_{TR}, T_{BR}, T_2$ and $T_3$.

In the given examples, the method 110 (MPPM) is directed toward delivering or generating the pattern, which most nearly maintains area coverage (AC), x-centroid, y-centroid, and the number of transitions of the input area under conversion (see equations 2 though 5). For instance, in the exemplary embodiment of the first example, the AC statistic was of the highest priority. In the binary conversion examples given here, only those patterns that are supported by the output resolution and minimize the AC error are considered. These output patterns are referred to as "candidates." From among these candidates, the centroid and transition statistics are used to further refine the pattern selection 120, 134. Equations 1–5 express in general terms how the candidates are evaluated in order to perform the selections 130, 134.

$$AC = (\Sigma_i p_i)/N, \qquad 2)$$

where N is the integer valued number of identically sized addressable regions (pixels) in the imaging area, and $p_i$, $i=1, 2, \ldots N$ are the binary values [0 is white, 1 is black] of these regions, $$X\text{centroid} = (\Sigma_i x_i p_i)/N, \qquad 3)$$

where $x_i$ is the value of the abscissa corresponding to the i'th region, $$Y\text{centroid} = (\Sigma_i y_i p_i)/N, \qquad 4)$$

where $y_i$ is the value of the ordinate corresponding to the i'th region, and

T=# of black-to-white and/or white-to-black transitions from left-to-right across the pattern, or 2; whichever is smaller.           5)

In the first example, the indicated output solutions of FIG. 2 were characterized as obvious because their evaluation under equations 2–5 indicated they were the best conversion solution for their respective input patterns.

Occasionally, none of the candidates provide an acceptable solution. This is determined by two error metrics, $\epsilon_1$ and $\epsilon_2$ given by equations 6 and 7, respectively. If every candidate pattern causes the magnitude of either $\epsilon_1$ or $\epsilon_2$ to exceed an acceptability threshold, then the determination 122 is made that a "point-process" choice, or a choice based solely on information extracted 118 from the area under conversion, cannot be made. The features extracted 118 from the area under conversion are said to be insufficient. The thresholds ($\epsilon_1$ or $\epsilon_2$) are determined empirically, and depend on the input and output resolutions, the types of patterns expected from the RIP and the behavior of the marking engine. As explained above, when the features 118 are insufficient, contextual information and context-dependent criteria as described in reference to FIG. 4 are extracted 126.

$$\epsilon_1 = ((X\text{centroid} - X'\text{centroid})^2 = (Y\text{centroid} - Y'\text{centroid})^2)_{0.5}, \qquad 6)$$

where (X, Y) centroid is the centroid of the original imaging element area, and (X', Y') is the centroid of the converted imaging area, and the error measure is the Euclidean distance between these two centroids, and $$\varepsilon_2 = \frac{1}{A} \int |original - converted| dA, \ A \neq 0. \qquad 7)$$

The following example illustrates some additional quality and implementation issues. Again, as explained below, the imaging element area is selected to be the size of a single 600×600 dpi pixel.

The input resolution is symmetric at 2400×2400 dpi, and the output resolution is 8×HA (4800×600). As explained in regard to the first example, it is preferred that A) $V1*R1 = V2*R2$, and B) $H1*C1 = H2*C2$. That is, it is desirable that the shape, size and/or aspect ratios of the area under conversion and the related or corresponding output area are the same. Again, this is beneficially achieved by selecting the dimensions of the sides of these areas to be the least common multiples of the reciprocals of the two respective resolutions (input and output) that provide a conversion with and acceptably low quantization error.

In the 2400×2400 input resolution to 4800×600 output resolution case, H1=2400 dpi, H2=600 dpi, V1=2400 dpi, and V2=4800 dpi. We seek the smallest integer values of R1 and R2 such that A) holds, namely R1/2400=R2/600, and the smallest integer valued C1 and C2 such that B) holds, namely C1/2400=C2/4800. This leads to R1=4, C1=1, and R2=1, and C2=2.

This implies that a single column of four pixels in the input imaging element would be mapped to a single row of two pixels in the output imaging element. Since the areas (AC) are the same size, the pixels in the output imaging element area are twice the size of the pixels of the input area under conversion (since there are four pixels in the input area under conversion and only two in the related or corresponding output area). This means that conversions based on such an area selection 114 would often have an area quantization error of ¼ of the imaging element area (AC). For example, if one of the four pixels in the input imaging element area were on or marked, this would have to be mapped to either an on pixel or an off pixel in the output area. In either case, the amount of area marked in the output imaging element area would be different from the amount of area marked in the input area under conversion by ¼ of the total area coverage (AC). In many cases this level of quantization error would be unacceptably high.

The area selection 114 process continues, for example, by considering areas having sides based on the next least common mutltiple or R1=4, C1=2, R2=1, and C2=4. Here there are eight pixels in the input area (4×2) and four pixels in the output area (1×4). The maximum quantization error associated with such and area selection 114 would be ⅛ of the conversion area (AC). This would still be too high for many applications The next least common multiple leads to R1=4, C1=3, R2=1, and C2=6. Here there are twelve pixels in the input area (4×3) and six pixels in the output area (1×6). The maximum quantization error associated with such and area selection 114 would be 1/12 of the conversion area. This may be unacceptably high in some applications.

Figure 13:
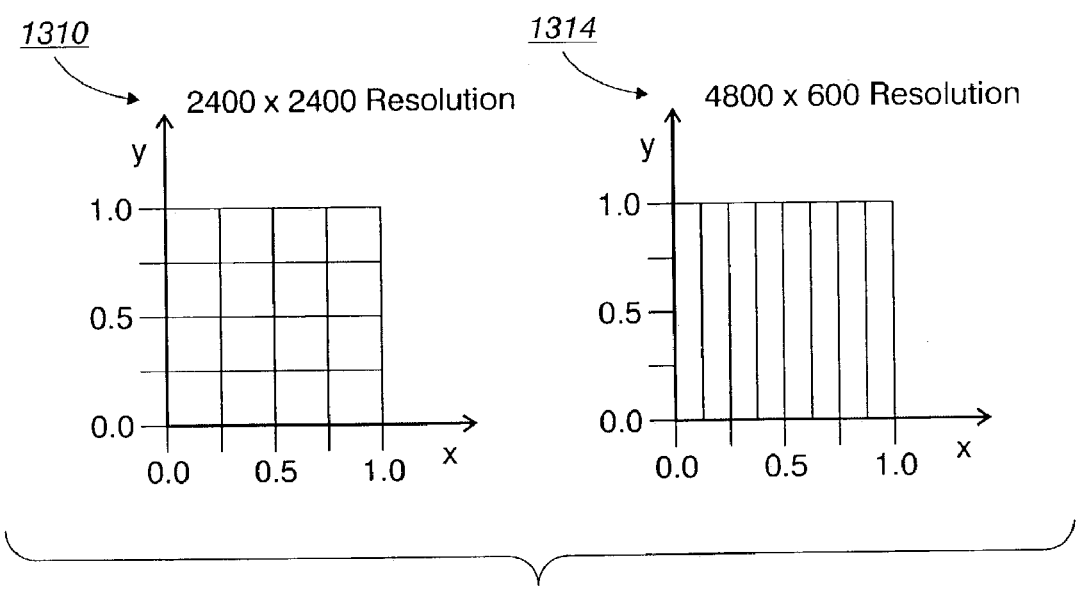
FIG. 13 is diagram of an input imaging element area including sixteen equal sized addressable areas or pixels and an output imaging element area having eight equal sized addressable areas or pixels.

The next least common multiple leads to R1=4, C1=4, and R2=1, and C2=8. Here there are sixteen pixels in the input area (4×4) and eight pixels in the output area (1×8). The maximum quantization error associated with such and area selection 114 would be 1/16 of the conversion area. In this example, 1/16 of the conversion area is considered an acceptable quantization error and the area under conversion is selected 114 to encompass four rows of four pixels. The related or corresponding output area has one row of eight pixels. These input and output areas are illustrated in FIG. 13.

The input patterns have 16 equal sized addressable areas 1310 (N=16), and 17 distinct levels of AC, 0/16 through 16/16. As explained above, the output patterns have eight equal sized addressable areas 1314, and nine distinct levels of AC, 0/8 through 8/8, as also illustrated in FIG. 13. In this example, if the input AC is m/16, and m is odd valued, then the area coverage (AC) quantization error of 1/16 is unavoidable. However, under many circumstances, small AC errors are acceptable. A well designed clustered dot design should support no more than one potential AC error instance per cluster, for each and every gray level. This can be achieved by eliminating one vulnerable imaging area instance around the boarder of a cluster before allowing another. This sort of error is often insignificant.

Those of skill in the art will recognize that the use of a noise source and diffusion of quantization error might be applied in applications similar to this example. However, such procedures are not applied in this example.

Now, consider five sample input patterns and recommended converted or output patterns suggested in FIG. 14. In general, there are 256 ($2^8$) distinct binary patterns that can be assigned as the converted or output imaging element area pattern. As mentioned above, first, we restrict the search to those patterns that preserve AC. The area coverage of the five sample input patterns is 50%. This reduces the search to output patterns "8 choose 4." There are 70 such patterns to choose from. Note that the original imaging area can support 65,536 ($2^{16}$) distinct patterns, so it should not be surprising that a number of distinctly different input patterns may be converted to a common output pattern. For each input pattern, we evaluate candidate output patterns in a search to find one that minimizes $\epsilon_1$, $\epsilon_2$ and preserves or minimizes the number of transitions. Four of the five input patterns have point-process output candidates that are considered sufficient 122 solutions, as illustrated in FIG. 14. The fifth input pattern 1420 does not have an obvious or sufficient solution and will require a context dependent 126, 130 choice similar to those described in reference to FIG. 4. Although the centroid error $\epsilon$ is zero for the entire imaging area in example 5 of FIG. 14, the centroid error is not zero for each of the two connected components taken individually. It may be preferable to minimize error for each component. However, achieving this objective is a low priority in this example.

The calculations described above are typically performed offline, and the results are stored into a point-process LUT (e.g., 526). In the example above, this resolution conversion requires a 16 to 8 mapping. This suggests a LUT requiring 32K bytes of memory. However, binary patterns are highly clustered within very small imaging areas. Therefore, memory requirements can be reduced by indexing into a sparse collection of 12 bits instead of using all 16. This reduces the size of the required memory by a factor of 16 ($2^4$), down to 2K bytes. The values of the missing bits can be estimated based on the binary values of the areas in their neighborhood.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for converting a first imaging element having a first resolution into a second imaging element having a second resolution, the method comprising:
   selecting a small area of the first imaging element to be an area under conversion;
   examining the area under conversion;
   selectively extracting context information from areas in the first imaging element neighboring the area under conversion; and,
   selecting an imaging element area pattern from a plurality of imaging element area patterns in the second resolution based on a preservation of at least one aspect of the area under conversion, and selectively, on the extracted context information.

2. The method of claim 1 wherein examining the area under conversions comprises:
   determining an area coverage aspect of the area under conversion.

3. The method of claim 1 wherein examining the area under conversion comprises:
   determining a centroid of the area under conversion.

4. The method of claim 1 wherein examining the area under conversion comprises:
   determining a connectedness aspect of the area under conversion.

5. The method of claim 1 wherein examining the area under conversion comprises:
   determining an area coverage aspect of the area under conversion;
   determining a centroid of the area under conversion; and,
   determining a connectedness aspect of the area under conversion.

6. The method of claim 2 wherein selecting the imaging element area pattern from a plurality of imaging element area patterns comprises:
   selecting an imaging element area pattern from the plurality of imaging element area patterns that most closely preserves the area coverage of the area under conversion.

7. The method of claim 3 wherein selecting the imaging element area pattern from a plurality of imaging element area patterns comprises:
   selecting an imaging element area pattern from the plurality of imaging element area patterns that most closely preserves the centroid of the area under conversion.

8. The method of claim 4 wherein selecting the imaging element pattern from a plurality of imaging element area patterns comprises:

selecting an imaging element area pattern from the plurality of imaging element area patterns that most closely preserves the connectedness of the area under conversion.

9. The method of claim 5 wherein selecting the imaging element area pattern from a plurality of imaging element area patterns comprises:
   selecting an imaging element area pattern from the plurality of imaging element area patterns that most closely preserves the area coverage, centroid and connectedness of the area under conversion.

10. The method of claim 1 wherein extracting context information from areas in the first imaging element neighboring the area under conversion comprises:
   determining a black/white/indeterminate connectedness between the area under conversion and the neighboring areas.

11. The method of claim 10 wherein selecting the imaging element area pattern from a plurality of imaging element patterns comprises:
   selecting the imaging element pattern based on the black/white/indeterminate connectedness determination.

12. The method of claim 1 further comprising:
   deciding to select the imaging element pattern based on context information, based on a measurement of error between a centroid of the area under conversion and a centroid of a candidate imaging element area pattern.

13. The method of claim 1 further comprising:
   deciding to select the imaging element area pattern based on context information, based on a measurement of error between an area coverage of the area under conversion and an area coverage of a candidate imaging element area pattern.

14. The method of claim 1 further comprising:
   deciding to select the imaging element pattern based on context information, based on a measurement of error between an area coverage of the area under conversion and an area coverage of a candidate imaging element area pattern and on a measurement of error between a centroid of the area under conversion and a centroid of a candidate imaging element area pattern.

15. The method of claim 1 wherein selecting an imaging element pattern area from a plurality of imaging element area patterns comprises:
   selecting a pattern from a sparsely filled look up table;
   reconstructing missing data in association with the selected pattern; and,
   combining the reconstructed data with the selected pattern.

16. The method of claim 1, wherein selecting a small area comprises:
   selecting dimensions of sides of the small area and a related output imaging element area to be least common multiples of reciprocals of the first and second resolutions that provide a conversion with an acceptably low quantization error.

17. An apparatus operative to convert a first imaging element having a first resolution into a second imaging element having a second resolution, the apparatus comprising:
   means for providing a second imaging element area pattern based on processing of an imaging element area under going conversion;
   means for providing a second imaging element area pattern based on a context of the imaging element area undergoing conversion; and
   means for selecting between the imaging element area pattern from the means for providing a second imaging element area pattern based on processing of an area under going conversion and the imaging element area pattern from the means for providing a second imaging element area based on a context.

18. The apparatus of claim 17 wherein the means for providing a second imaging element area pattern based on processing of the imaging element area under going conversion comprises:
   a point process look up table.

19. The apparatus of claim 17 wherein the means for means for providing a second imaging element area pattern based on a context comprises:
   a context dependent look up table.

20. The apparatus of claim 17 wherein the means for selecting between the pattern from the means for providing a second imaging element area pattern based on processing of the imaging element area undergoing conversion and a pattern from the means for providing the second imaging element based on the context comprises:
   a multiplexer operative to receive a signal indicating whether or not information available in the imaging element area undergoing conversion is sufficient for basing a selection of a second imaging element on, and further operative to receive an first imaging element area pattern from the means for providing a second imaging element area pattern based on processing of the imaging element area under going conversion and the second imaging element area pattern from the means for providing a second imaging element based on a context.

21. The apparatus of claim 19 further comprising:
   means for generating an index into the context dependent look up table based on an aspect of a previously converted area neighboring the area under conversion and an aspect of a neighboring area next to be processed.

22. The apparatus of claim 21 wherein the means for generating an index comprises:
   a next pixel table operative to predict a state of an output pattern associated with an image element area bordering the imaging element area undergoing conversion; and
   a delay block operative to provide the state of an output pattern of an image element area previously converted neighboring the imaging element area undergoing conversion.

23. The apparatus of claim 17 further comprising an electrophotographic-rendering device for rendering the selected imaging element area pattern.

24. A method for translating to "a binary" image in a first resolution into a a binary image in a second resolution using morphological partial pixel mapping, the method comprising:
   selecting an image area for translating from the first resolution to the second resolution;
   extracting local features from the selected area;
   determining if the extracted local features provide enough information to use point processing techniques to generate a related image area in the second resolution;
   generating an index into a point process look up table from the extracted local feature information if it is determined that the extracted local features provide enough information;

extracting context information from neighboring image areas if it is determined that the extracted local features do not provide enough information;

generating an index into a contextual look up table based on a combination of the extracted local feature information and the extracted context information if it is determined that the extracted local features do not provide enough information; and, outputting an image pattern in the second resolution based on an output from one of the point process look up table and the contextual look up table.

25. The method of claim 24 wherein extracting local features comprises at least one of:

extracting an area coverage parameter;
extracting centroid information; and
extracting a measure of connectedness.

26. The method of claim 24 wherein generating an index into a point process look up table comprises:

using binary pixel information from the selected image area as an index into the point process look up table.

27. The method of claim 24 wherein extracting context information from neighboring image areas comprises at least one of:

determining a state of a first binary pixel element from a neighboring converted image area; and predicting a state of a second binary pixel element from a neighboring image area that is yet to be converted.

28. The method of claim 24 further comprising:

rendering the outputted image pattern with an electrophotographic rendering device optimized for rendering images with the second resolution.

29. The method of claim 24, wherein selecting a small area comprises:

selecting dimensions of sides of the small area and a related output imaging element area to be least common multiples of reciprocals of the first and second resolutions that provide a conversion with an acceptably low quantization error.

* * * * *